W. STROHMER.
MOTOR PLOW.
APPLICATION FILED JUNE 23, 1909.
987,652.
Patented Mar. 21, 1911.
4 SHEETS—SHEET 1.
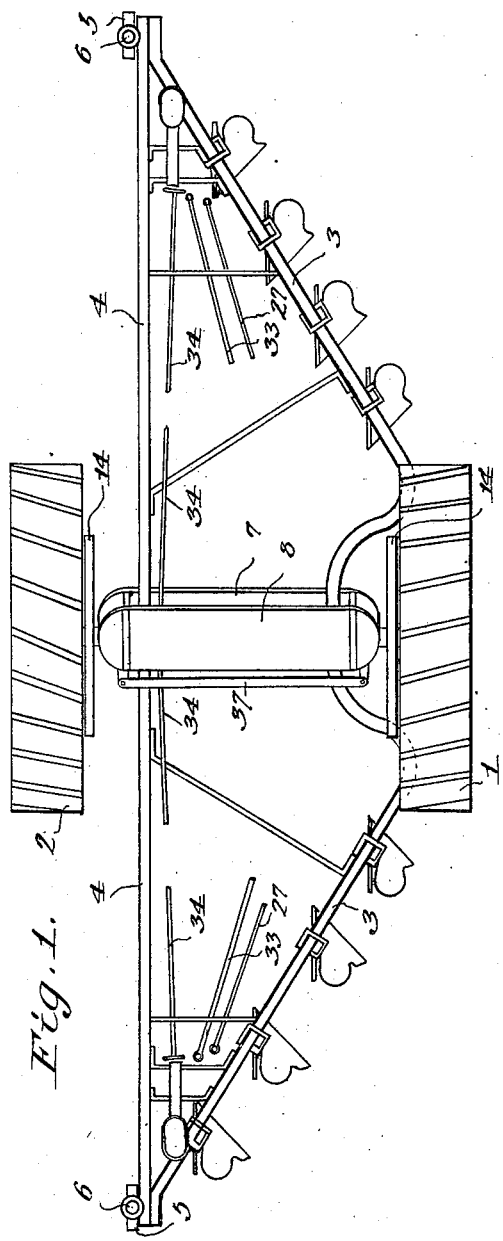
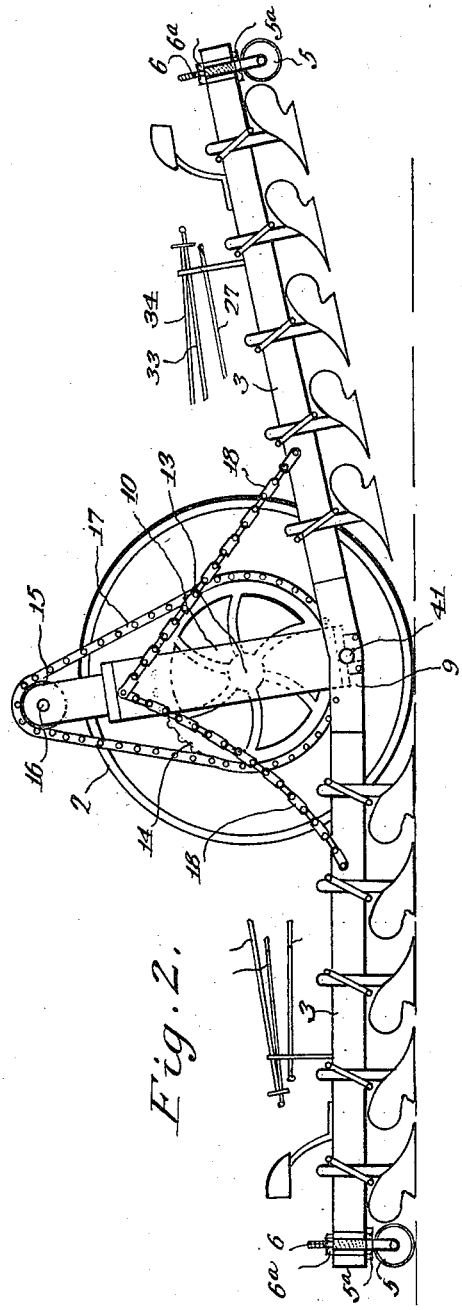
WITNESSES:
INVENTOR.
William Strohmer
BY
Lyman J. Henry
ATTORNEY.

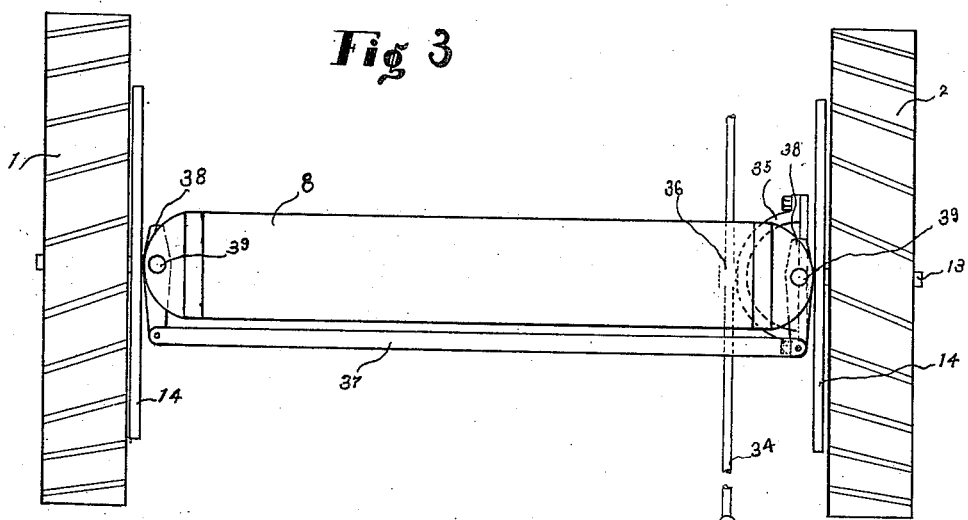
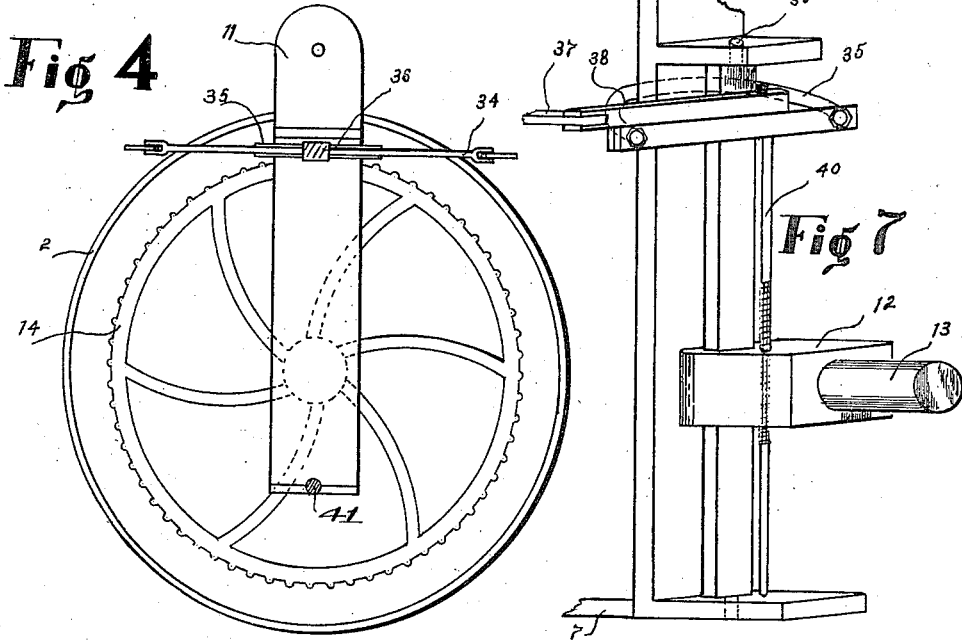
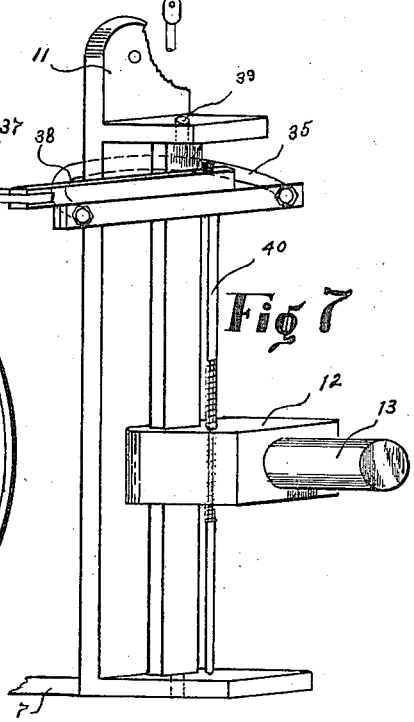

W. STROHMER.
MOTOR PLOW.
APPLICATION FILED JUNE 23, 1909.

987,652.

Patented Mar. 21, 1911.

4 SHEETS—SHEET 3.

WITNESSES:
C. M. Walken
Maude S. Engle

INVENTOR.
William Strohmer
BY Lyman I. Henry
ATTORNEY.

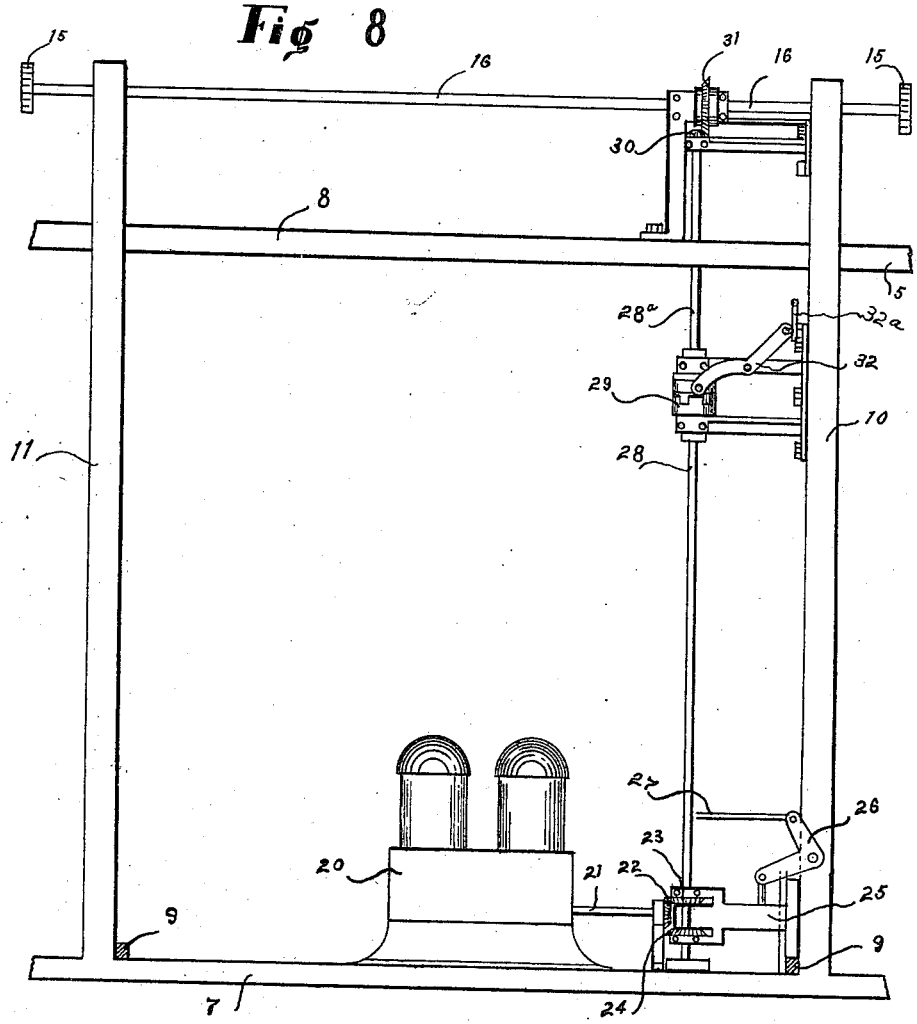

UNITED STATES PATENT OFFICE.

WILLIAM STROHMER, OF PUEBLO, COLORADO.

MOTOR-PLOW.

987,652.  Specification of Letters Patent.  Patented Mar. 21, 1911.

Application filed June 23, 1909. Serial No. 503,907.

*To all whom it may concern:*

Be it known that I, WILLIAM STROHMER, a citizen of the United States, residing at 1410 Orman avenue, Pueblo, Colorado, have invented certain new and useful Improvements in Motor-Plows, of which the following is a specification.

Figure 5:
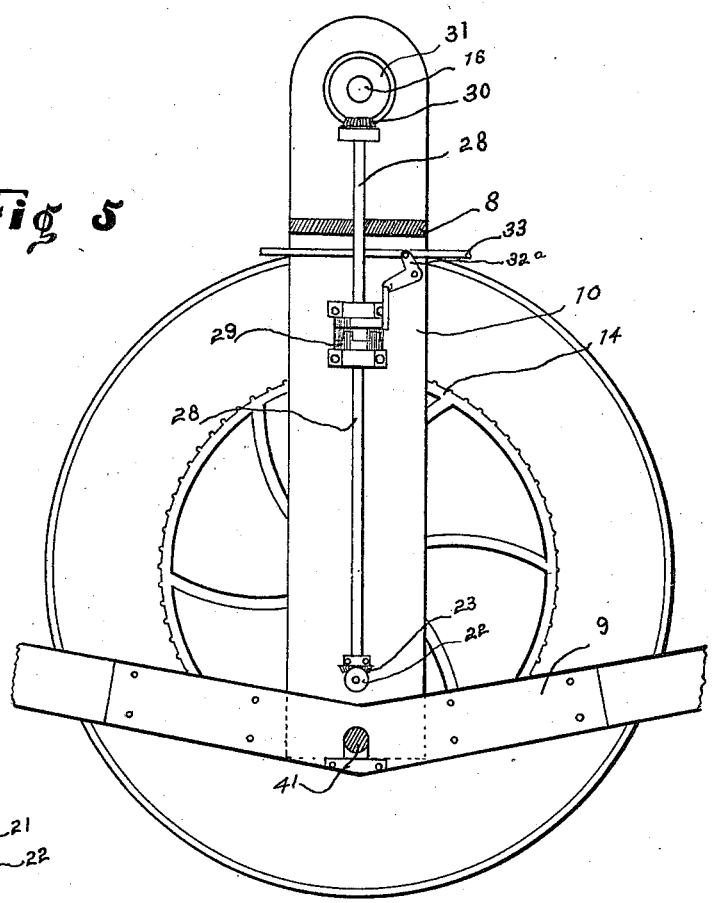
Figure 6:
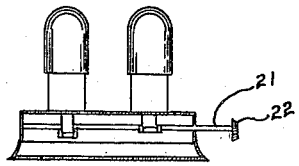

My invention relates to motor plows in which the power is applied to two laterally disposed wheels and the objects of my invention are; first, to provide a motor plow propelling means on the mechanism so that it may move in either direction; second, to provide a motor plow with ready adjustment as to depth and facilities in steering; third, to provide a motor plow with means to plow in either direction and to remove engaged plows and to engage disengaged plows by the motive power means; and other objects which will be disclosed in the description of my device. I attain these objects by the mechanisms illustrated in the accompanying drawings, in which, Figure 1 is a plan view showing the relative position of the plows to the operating mechanisms; Fig. 2 is an elevation with the wheel on one side removed, driving and carrying chains in elevation and operating levers in broken section; Fig. 3 is a top plan view of the drive wheels and steering device; Fig. 4 is an elevation in partly broken section showing the steering device; Fig. 5 is an elevation showing driving gear, dental clutch, and balancing link; Fig. 6 is a view in broken section of the engine and crank shaft; Fig. 7 is an elevation in broken section showing a housing carrying cross head and spindle with height adjustment for same; and Fig. 8 is an elevation showing engine and transmission of power to driving shaft together with part of frame work.

Similar numerals refer to similar parts throughout the several views.

On a suitable frame composed of uprights 10 and 11 with cross bars 7 and 8 are adjusted plow frames 3 and 4 connected by pivot link 9 bearing pivotally upon the journal 41 provided on the horizontal frame piece 7. Attached near each end of frame pieces 7 and 8 and turnable therein is journaled axle guide 39 which carries keyed to the top thereof a lever 38. Attached to each of said journaled axle guides 39 and slidable thereon is a crosshead 12 provided with a spindle 13 for each wheel. In each of said crossheads is a threaded screw opening in which operates the adjusting screw 40. Attached to said journaled axle guide 39 on one side as shown in the plans being next the wheel 2 is the quadrant 35. In the teeth of said quadrant the worm gear 36 is operated by the rod 34 from the operator's seat. The levers 38 are attached by crossbar 37. On the inside of each drive wheel and attached thereto is sprocket wheel 14. In the top of the upright parts of the frame 10 and 11 is adjusted the driving shaft 16 having on each end thereof the sprocket wheels 15 and said driving shaft is provided with compensating gear 31.

The engines 20 are disposed preferably on the frame piece 7 and are connected to crank shaft 2 which is provided with beveled gear 22 in which meshes reversing gears 23 and 24 held in operative bearings 25 and attached to intermediate upright shaft 28. Said reversing beveled gears are operated by crank means 26 connected to operator's position by operating rod 27 with necessary intermediate bell crank lever to change the direction of power. On the upper end of the intermediate shaft 28 is clutch means 29 supported by proper bearings on upright portion of frame and connected with said clutch is the other part of the intermediate shaft $28^a$ on which is beveled gear 30 at which point the shaft is supported by proper bearings attached to upright portion of frame and said beveled gear meshes in the compensating gear 31. The said clutch is operated by suitable levers 32 and $32^a$ to which is connected attached operating rod 33 extending to the operator's position. A seat is provided on each set of plows for operator and the rods 27, 33 and 34 are duplicated, so that in whichever direction the mechanism is being driven the operator may occupy a seat on the beam carrying the engaged plows.

At each end of the plow bearing frames composed of the plow carrying pieces 3 and the bracing pieces 4 is the supporting wheel 5 having thereon a screw threaded shank 6, with adjusting nuts $5^a$ and $6^a$ by means of which adjustments may be made, and plows may be held out of engagement while device is being taken from place to place. Supporting chains 18 are connected from near the top of the upright frame work to the plow supporting frames. Also sprocket chain 17 operates over sprockets 14 and 15 transmitting the power from the engine driven shaft 16 to the drive wheels and tilting downward into the ground the plows on the frame in the rear of the direction in which the device is moving.

Power being applied through the driving shaft 16 and sprocket chain 17 and wheel to the drive wheels, when power is furnished by means of an engine mounted on the structure, that set of plows in the rear of the direction given are brought to the ground and forced into position as far as permitted by the adjustment, as the sprocket wheel 15 being the driving sprocket pulls the sprocket chain 17 taut on the side opposite from the direction in which it is being driven and as the whole of the mechanism is balanced at journal 41 the consequence is that in any forward movement of the drive wheels 1 and 2 the plows in front of the given direction are lifted and those in the rear are lowered.

It is evident that by the operation of the rod 34 the drive wheels may be guided in any given direction simultaneously. In like manner it is evident that the drive wheels are adjustable to any required depth for plowing by means of the adjustable crosshead 12 and adjusting screw 40 as well as the adjustment of the respective drive wheels to allow for the furrow depth, and in connection with the adjustable shanks 6 and wheels 5 the required depth of plow may be obtained.

I am aware that plows have been made with the carrying frame in general form similar to that which I have provided. Broadly I claim in such balanced adjustment the driving of the same by motor means attached to the frame and by the special connection made between a motor driven shaft and the driving wheels whereby the plows are operated and directed into the ground as a means not hertofore utilized. By having a frame extending perpendicularly above the axle of the drive wheels, and a driving shaft adjusted in the top thereof with sprocket wheels thereon, and sprocket wheels on the driving wheels, connected by sprocket chain, and the driving shaft actuated by motor power fixed on the frame work with the whole of the frame work balanced on a journal bearing as described, the pull on the sprocket chain between the upper and lower sprocket wheels is on the rear side of the direction in which the device is moving and pulls down the plow frames as above stated, so that the plows engage the soil. Likewise the change of direction is provided for as well as the guiding means so that the drive wheels also constitute the guide wheels.

I have provided a place for the engine of the motor on the frame work, but the same may be placed at any point thereon found convenient, and in like manner the in and out of gear device may be placed at any desired point on the intermediate shaft 28 or the shaft 28$^a$, and it is readily seen that any clutch may be used that is suitable and it is no departure from my invention to use any form of desired clutch.

I claim:—

1. In a motor plow of the character described having plows on a balanced frame with a motor thereon and supported by drive wheels, an upright frame, a driving shaft connected with said motor mounted centrally over the drive wheels in the upper part of said upright frame with sprocket wheels attached, sprocket wheels on said drive wheels connected by sprocket chain means with the sprocket wheels on said driving shaft, substantially as set forth.

2. In a motor plow of the character described the combination of plows on balanced beams, two drive wheels each carrying a sprocket wheel, a frame with upright portion carrying pivotally the balanced beams, a motor fixed to said frame, and a driving shaft at the top of the upright frame disposed centrally over said drive wheels having sprocket wheels operatively connected with said sprocket wheels on said drive wheels, substantially as set forth.

3. In a motor plow of the character described with two drive wheels with two supporting wheels, having a balanced plow-carrying frame pivotally attached to an upright frame between said drive wheels, provided with a motor; two journaled axle guides pivoted in said upright frame with a lever attached to each thereof connected by a bar pivotally attached thereto; a worm gear quadrant attached to one of said journaled axle guides with worm gear means for operation; a crosshead with a spindle slidable on each journaled axle guide with screw means for adjustment, substantially as set forth.

4. In a motor plow of the character described provided with two drive wheels each carrying a sprocket wheel, having a balanced plow-carrying frame provided with supporting wheels pivotally attached to an upright frame between the drive wheels, carrying a motor fixed to said upright frame; a driving shaft at the top of the upright frame disposed centrally over said drive wheels having sprocket wheels connected by sprocket chain means with said sprocket wheels on said drive wheels; two journaled axle guides pivotally attached in said frame connected by lever and bar means; a spindle slidable on each of said journaled axle guides with screw means of adjustment; a stay chain means attached near the top of said upright frame at one end with the other end attached to the plow-carrying frame on each side of said upright frame to each adjacent side of said plow-carrying frame; substantially as set forth.

WILLIAM STROHMER.

Witnesses:
 HARRY E. GARRETT,
 C. M. WALKER.

Copies of this patent may be obtained for five cents each, by addressing the "Commissioner of Patents, Washington, D. C."